US010658940B2

(12) United States Patent
Shin et al.

(10) Patent No.: US 10,658,940 B2
(45) Date of Patent: May 19, 2020

(54) POWER CONVERTER

(71) Applicant: NISSAN MOTOR CO., LTD., Yokohama-shi, Kanagawa (JP)

(72) Inventors: Kentaro Shin, Kanagawa (JP); Kraisorn Throngnumchai, Kanagawa (JP); Tetsuya Hayashi, Kanagawa (JP); Akinori Okubo, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/538,801

(22) PCT Filed: Dec. 26, 2014

(86) PCT No.: PCT/JP2014/084657
§ 371 (c)(1),
(2) Date: Jun. 22, 2017

(87) PCT Pub. No.: WO2016/103496
PCT Pub. Date: Jun. 30, 2016

(65) Prior Publication Data
US 2018/0006571 A1    Jan. 4, 2018

(51) Int. Cl.
*H02M 7/00* (2006.01)
*H02M 7/48* (2007.01)
*H02M 1/44* (2007.01)

(52) U.S. Cl.
CPC .............. *H02M 7/003* (2013.01); *H02M 7/48* (2013.01); *H02M 1/44* (2013.01)

(58) Field of Classification Search
CPC ........... H02M 7/003; H02M 7/48; H02M 1/44

USPC ...................................... 361/679.01
See application file for complete search history.

(56) References Cited

U.S. PATENT DOCUMENTS

| 6,208,537 B1 | 3/2001 | Skibinski et al. |
| 8,112,853 B2* | 2/2012 | Yoshinaga ............. H01L 25/072 29/25.42 |
| 9,112,402 B2 | 8/2015 | Takahashi et al. |
| 2002/0075702 A1 | 6/2002 | Igarashi et al. |
| 2009/0010029 A1 | 1/2009 | Mizukoshi et al. |
| 2011/0292686 A1* | 12/2011 | Oka ........................ H02M 1/14 363/13 |
| 2014/0153189 A1* | 6/2014 | Okamura ............. H05K 1/0213 361/688 |
| 2014/0321171 A1* | 10/2014 | Fujita ...................... H02M 1/14 363/37 |

(Continued)

FOREIGN PATENT DOCUMENTS

EP    1 835 609 A1    9/2007
EP    2 131 481 A1    12/2009

(Continued)

*Primary Examiner* — Rockshana D Chowdhury
(74) *Attorney, Agent, or Firm* — Foley & Lardner LLP

(57) ABSTRACT

A power converter including an inverter for converting electric power output from a power supply, a first power feeding bus connected to the inverter and to the positive side of the power supply, a second power feeding bus connected to the inverter and the negative side of the power supply, and a plurality of connection circuits including a resistant member and a capacitive member which are connected in series, connected between the first power feeding bus and the second power feeding bus, and having at least two or more different impedances.

9 Claims, 13 Drawing Sheets

(56) References Cited

U.S. PATENT DOCUMENTS

2014/0355221 A1* 12/2014 Sawada ............... H05K 7/1432
　　　　　　　　　　　　　　　　　　　　　　　361/735
2015/0292511 A1* 10/2015 Sakai ..................... H02K 7/14
　　　　　　　　　　　　　　　　　　　　　　　417/423.1

FOREIGN PATENT DOCUMENTS

| JP | 08-098539 A | | 4/1996 |
|---|---|---|---|
| JP | 2011-68284 A | | 3/2001 |
| JP | 2002-252985 A | | 9/2002 |
| JP | 2009-038961 A | | 2/2009 |
| JP | 2009027089 A | * | 2/2009 |
| JP | 2011-135705 A | | 7/2011 |
| JP | 2013-135538 A | | 7/2013 |
| JP | 2014-87107 A | | 5/2014 |
| WO | WO-2009/147985 A1 | | 12/2009 |
| WO | WO-2014/073159 A1 | | 5/2014 |

* cited by examiner

POWER CONVERTER

TECHNICAL FIELD

The present invention relates to a power converter.

BACKGROUND ART

There is known a noise reducer for a power converter device including a converter connected to an AC power source, an inverter connected to a direct-current (DC) output side of the converter, and a DC smoothing capacitor connected to a DC intermediate circuit. The noise reducer reduces noise current flowing through the power converter by switching ON and OFF of a semiconductor switching element included in the inverter. The noise reducer includes a noise-current detector for detecting noise current and a noise compensation current supplier that generates noise compensation current for reducing detected noise current and supplies the noise compensation current to the power converter. The noise compensation current supplier includes a series circuit consisting of a transistor, which is an element where output current of the element is controlled by a signal detected by a noise-current detector and with lower withstand voltage than the voltage of a DC intermediate circuit, and a Zener diode (Patent Document 1).

PRIOR ART DOCUMENT

Patent Document

[Patent Document 1] JP 2002-252985 A

SUMMARY OF INVENTION

Problem to be Solved by Invention

However, there is a problem that with respect to a high-frequency switching noise, noise cannot be suppressed because the transistor and Zener diode cannot operate at high speed.

Means for Solving Problems

The present invention solves the problems by including a first power feeding bus connected to an inverter and positive side of a power supply, a second power feeding bus connected to the inverter and negative side of the power supply, and a plurality of connection circuits including a resistant member and capacitive member which is connected connecting a resistant member and capacitive member in series, connected between the first power feeding bus and the second power feeding bus, and having at least two or more different impedances.

Effect of Invention

According to the present invention, oscillation generated at the power feeding bus due to switching of the inverter is suppressed by the plurality of connection circuits, and as a result, noise can be suppressed.

MODES FOR CARRYING OUT THE INVENTION

In the following, embodiments of the present invention will be described with reference to the drawings.

First Embodiment

Figure 1:
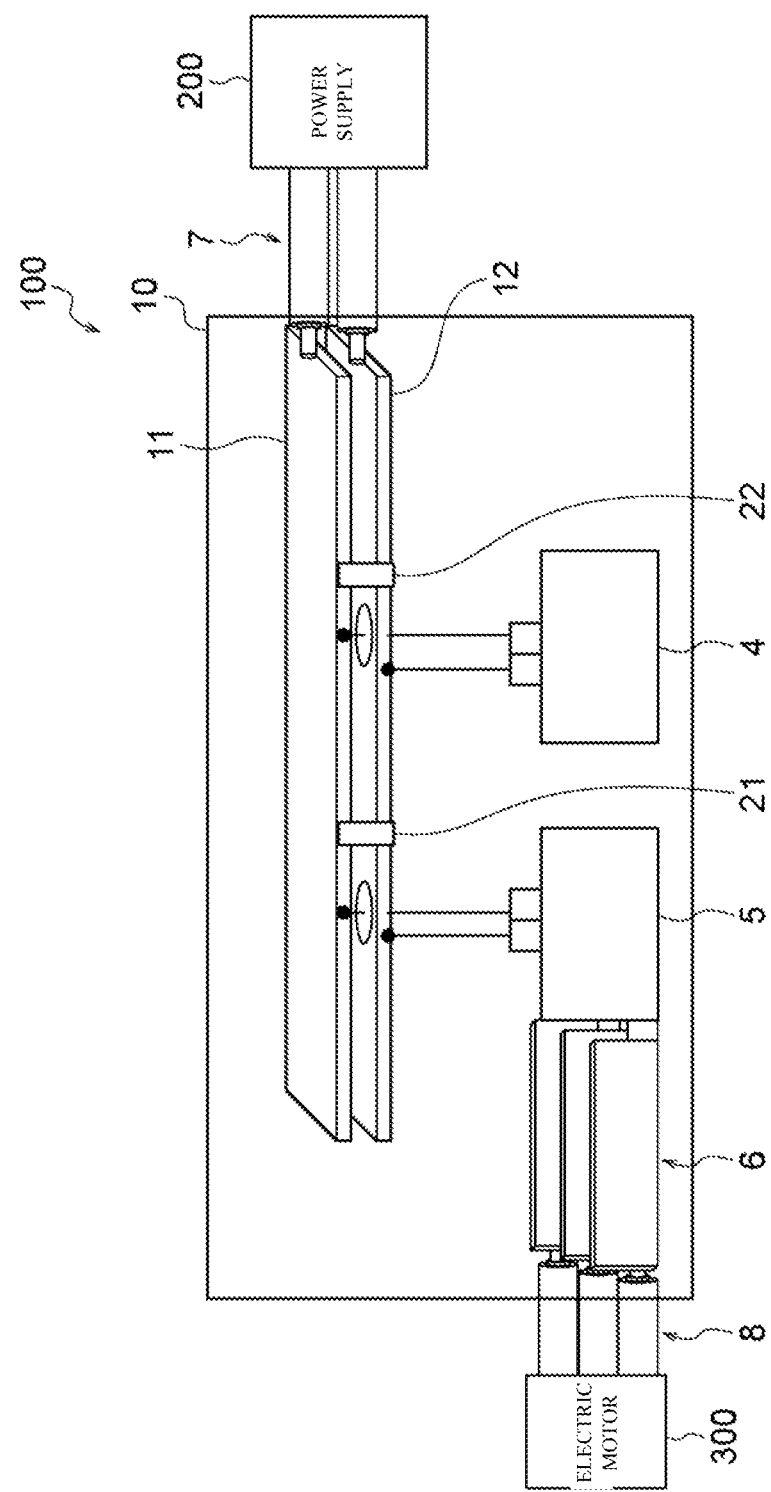
FIG. 1 is a block diagram of a drive system according to an embodiment of the present invention.

FIG. 1 is a schematic diagram of a drive system of an electric vehicle including a power converter according to a present embodiment. A power module 5 and the like are housed in a case 10 such that they cannot be actually seen from the outside, however, they are indicated in FIG. 1 for explanation. Similarly, A power module 5 and the like are also shown in other drawings. The electric vehicle of the present embodiment is a vehicle that drives using an electric motor 300 such as a three-phase alternating-current (AC) power motor as a drive source, and the electric motor 300 is connected to an axle of the electric vehicle. In the following, the present embodiment will be explained using the electric vehicle as an example. However, the present invention is also applicable to hybrid vehicles (HEV) and also to a power converter mounted to an apparatus other than vehicles.

The drive system including the power converter according to the present embodiment includes a power converter 100, a DC power supply 200, an electric motor 300, and shielded wires 7 and 8. The DC power supply 200 includes a plurality of batteries and is connected to the power converter 100 by the shielded wires 7. The DC power supply 200 becomes a power source of the vehicle and supplies DC power to the power converter 100. The power converter 100 is connected between the DC power supply 200 and the electric motor 300 and converts DC power supplied from the DC power supply 200 to AC power and supplies the AC power to the electric motor 300. The shielded wires 7 and 8 are wires formed by coating metal wires with resin. The shielded wires 7 is configured from a pair of shielded wires, and one of the shielded wires 7 connects a positive electrode terminal of the DC power supply 200 with a power feeding bus 11, and the other of the shielded wires 7 connects a negative electrode terminal of the DC power supply 200 with a power feeding bus 12. The shielded wires 8 are configured from three shielded wires. The three shielded wires 8 correspond to U-phase, V-phase, and W-phase of the electric motor 300 respectively and connect bus bars 6 with the electric motor 300.

The power converter 100 includes a case 10, the power feeding buses 11 and 12, a passive element part, a smoothing capacitor 4, a power module 5, and bus bars 6. The case 10 is a case made with metal to house the power feeding buses 11 and 12, the passive element part 30, the smoothing capacitor 4, the power module 5, and the bus bars 6. The power feeding bus 11 is formed by a plate-type (flat plate) conductor and is a power supply line to feed electric power output from the positive electrode side of the DC power supply 200 to the power module 5. The power feeding bus 11 corresponds to the power supply line on the P side among the inverter circuits included in the power converter 100. The power feeding bus 12 is formed by a plate-type (flat plate) conductor and is a power supply line to feed electric power output from the negative electrode side of the DC power supply 200 to the power module 5. The power feeding bus 12 corresponds to the power supply line on the N side among the inverter circuits included in the power converter 100. Between both of the main surfaces of the power feeding bus 11, one surface faces the inner-side surface of the case 10 with a space interposed therebetween. Also, between both of the main surfaces of the power feeding bus 12, one surface faces the inner-side surface of the case 10 with a space interposed therebetween. The other main surface of the power feeding bus 11 and the other surface of the power feeding bus 12 are faced each other with a space interposed therebetween. A part of the power feeding buses 11 and 12 or tips of the power feeding buses 11 and 12 become terminals (tabs) of the power converter 100 and are connected to tips of the shielded wires 7. By forming the power feeding buses 11 and 12 to a plate type, a resistance component and inductance component of the power feeding buses 11 and 12 can be reduced.

The power feeding buses 11 and 12 are connected to the positive electrode terminal and negative electrode terminal of the smoothing capacitor 4 respectively and to the positive electrode terminal and negative electrode terminal of the power module 5 respectively in order to branch their current flows. The power feeding buses 11 and 12 and the smoothing capacitor 4, and the power feeding buses 11 and 12 and the power module 5 are connected with wires. By connecting the smoothing capacitor 4 between the power feeding bus 11 and power feeding bus 12, the smoothing capacitor 4 is connected between the DC power supply 200 and the power module 5. The smoothing capacitor 4 is a condenser to rectify power input and output from the DC power supply 200.

The power module 5 is connected between the DC power supply 200 and the bus bars 6 via the power feeding buses 11 and 12. The power module 5 includes a plurality of semiconductor switching elements such as modularized IGBT or MOSFET and the like on a substrate. Then, by switching ON and OFF of the semiconductor switching element based on control signals from a controller not shown in the drawing, the power module 5 converts power from the DC power supply and outputs power to the electric motor 300 via the bus bars 6. The controller not shown in the drawing generates a switching signal for the semiconductor switching element from a torque command value that corresponds to an accelerator opening of the vehicle and outputs the switching signal to the power module 5. Subsequently, ON and OFF of the semiconductor switching element switches and AC power for obtaining desired output torque by the electric motor 300 is output from the power module 5. The power module 5 is electrically connected to the three-phase electric motor 300 with U-phase, V-phase, and W-phase output wires by corresponding them to the phases of the electric motor 300.

The bus bars 6 are formed from three plate-type conductive plates made of conductive material and connect the power module 5 and the shielded wires 8. The tips of the bus bars 6 become the terminals (tabs) of the power converter 100 and are connected to the tips of the shielded wires 8.

The plurality of connection circuits 21 and 22 are the circuits to suppress electrical oscillation (noise) generated in the power feeding bus 11 and the power feeding bus 12, and include a resistant member and a capacitive member. Further, the connection circuits 21 and 22 include a series circuit connecting the resistant member and the capacitive member in series. The resistant member is a passive element such as a resistor. The capacitive member is a circuit element such as a condenser. When a noise generated in the power feeding buses 11 and 12 flows through into the connection circuits, the noise is consumed at the resistor part and a DC component is cut by the capacitive member. The connection circuits 21 and 22 are connected between the power feeding bus 11 and the power feeding bus 12. Also, the connection circuit 21 and connection circuit 22 are disposed inside the case 10 in a state the connection circuits 21 and 22 are aligned in the longitudinal direction of the power feeding buses 11 and 12 with a space interposed therebetween.

A value of the impedance of the connection circuit 21 is different from a value of the impedance of the connection circuit 22. In the example shown in FIG. 1, the connection circuits 21 and 22 are connected to the power feeding buses 11 and 12, however, the number of connection circuits 21 and 22 is not limited to two, and it may be three or more. Also, when three or more connection circuits are connected, connection circuits may be designed so that impedances of all connection circuits different or the plurality of connection circuits to have at least two different impedances.

Now, a switching noise suppressed in the connection circuits 21 and 22 will be explained. The switching noise is generated between the power feeding bus 11 and power feeding bus 12 by switching operation of the power module 5. Then, as the switching noise transmits from the power feeding buses 11 and 12 to the case 10, the noise radiates from the case 10.

The frequency of noise that transmits from the power feeding buses 11 and 12 to the case 10 is decided such as by the shape of the power feeding buses 11 and 12. When the width of the plate-type power feeding buses 11 and 12 is "a" and the length is "b" (the short side of a main surface of the power feeding buses 11 and 12 is "a" and the long side is "b"), and permittivity between the power feeding buses 11 and 12 is "$\varepsilon_r$", the frequency ($F_{mn}$) of the switching noise can be expressed by the following formula (1). In the formula, "m" and "n" are integers and represent mode numbers.

[Formula 1]

$$f_{mn} = \frac{c}{2\pi\sqrt{\varepsilon_r}} \sqrt{\left(\frac{m\pi}{a}\right)^2 + \left(\frac{n\pi}{b}\right)^2} \quad (1)$$

For example, when a=0.9 m, b=0.03 m, and $\varepsilon_r$=4 are substituted into formula (1), the frequency ($f_{10}$) becomes 83.3 MHz when (m, n)=(1, 0). Since this frequency ($f_{10}$) is within an FM frequency band (76 MHz to 90 MHz, 87.5 MHz to 108 MHz), when the switching noise having the frequency ($f_{10}$) radiates out from the case 10, the switching noise may interfere with an onboard radio. Further, the switching noise may also adversely affect other electronic devices mounted on the vehicle.

In the power converter according to the present embodiment, the connection circuit 21 and connection circuit 22 are connected between the power feeding bus 11 and power feeding bus 12. In this way, when a switching noise is generated in the power feeding buses 11 and 12 by switching operation of the power module 5, transmission of the switching noise from the power feeding buses 11 and 12 to the case 10 is suppressed by the connection circuits 21 and 22. As a result, in the present embodiment, the noise due to switching of the power module 5 can be suppressed. Also, the number of parts does not increase largely since only installation of the connection circuits 21 and 22 is required, and what is more, reduction of high-frequency noises is possible with small and low-cost elements.

More, in the present embodiment, the connection circuit 21 and connection circuit 22 are disposed inside the case 10 in a state the connection circuit 21 and connection circuit 22 are aligned in the longitudinal direction of the power feeding buses 11 and 12 with a space interposed therebetween. In this way, as shown in FIG. 1, when the smoothing capacitor 4 or the like is connected to the power feeding buses 11 and 12 so as to branch each current flow of the power feeding buses 11 and 12, the connection circuit 21 can be connected to the power feeding buses 11 and 12 while avoiding the branch point of the current.

Further, in the present embodiment, the resistant member included in the connection circuits 21 and 22 is made with a passive member. In this way, the connection circuits 21 and 22 can be easily made.

Figure 2:
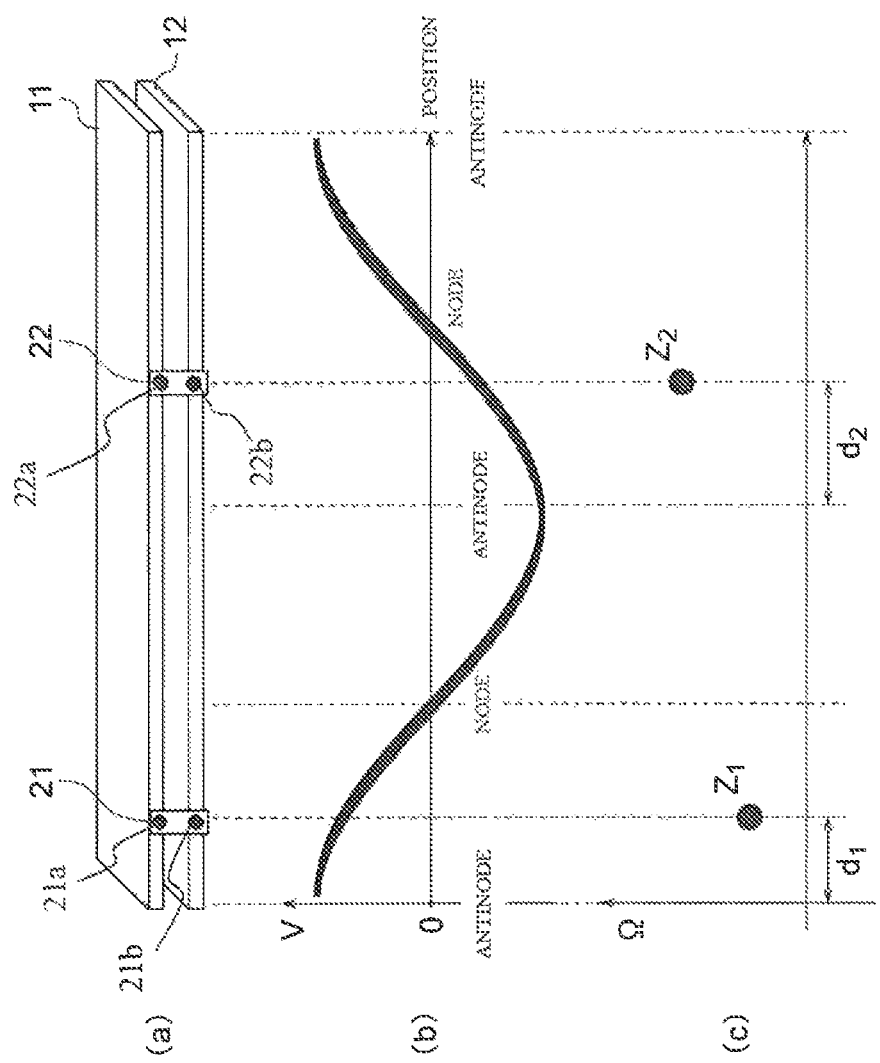
FIG. 2(a) is a perspective view of power feeding buses and connection circuits.
FIG. 2(b) is a graph illustrating a standing wave generated at the power feeding buses.
FIG. 2(c) is a graph showing impedances of the connection circuits with respect to the positions of the connection points of the connection circuits.

Next, the relationship between impedance of the connection circuit 21 and impedance of the connection circuit 22 will be explained using FIG. 2. FIG. 2(a) is a perspective view of the power feeding buses 11 and 12 and connection circuits 21 and 22, and FIG. 2(b) is a graph illustrating a standing wave generated at the power feeding buses 11 and 12. FIG. 2(c) is a graph showing impedances of the connection circuits 21 and 22 with respect to the positions of the connection points of the connection circuits 21 and 22. The horizontal axis in FIG. 2(b) and FIG. 2(c) represents the position on the power feeding buses 11 and 12 in the longitudinal direction from an end of the power feeding buses 11 and 12. The vertical axis in FIG. 2(b) represents voltage (V) and the vertical axis in FIG. 2(c) represents the magnitude (Ω) of impedance. In FIG. 2(c), "$Z_1$" represents the impedance of the connection circuit 21 and "$Z_2$" represents the impedance of the connection circuit 22.

When oscillation is generated between the power feeding bus 11 and power feeding bus 12 by switching operation by the power module 5, an oscillatory wave transmits through the power feeding buses 11 and 12. The oscillatory wave, which is the wave with various modes, reflects at the ends of the power feeding buses 11 and 12. As a result, the oscillatory waves that transmit through the power feeding buses 11 and 12 overlap and a standing wave as shown in FIG. 2(b) is generated in the power feeding buses 11 and 12.

The standing wave includes a part with large amplitude and a part with small amplitude and an antinode of the standing wave is located to the ends in the longitudinal direction of the power feeding buses 11 and 12.

The positions of a connection point of the connection circuit 21 with the power feeding bus 11, and a connection point of the connection circuit 21 with the power feeding bus 12 become the same on the coordinate axis of the longitudinal direction of the power feeding buses 11 and 12. More, the positions of the connection point of the connection circuit 22 with the power feeding bus 11 and the connection point of the connection circuit 22 with the power feeding bus 12 become the same on the coordinate axis of the longitudinal direction of the power feeding buses 11 and 12. In the following, the connection point of the connection circuit 21 with the power feeding bus 11 and the connection point of the connection circuit 21 with the power feeding bus 12 are collectively called as "the first connection point" 21a, 21b. Also, the connection point of the connection circuit 22 with the power feeding bus 11 and the connection point of the connection circuit 22 with the power feeding bus 12 are collectively called as "the second connection point" 22a, 22b.

The first connection point 21a, 21b is located between an antinode at an end of the power feeding buses 11 and 12 and a node. The second connection point 22a, 22b is located between an antinode at the midpoint of the power feeding buses 11 and 12 and a node. The midpoint of the power feeding buses 11 and 12 is the middle point between one end of the power feeding buses 11 and 12 and the other end. Also, the distance ($d_1$ shown in FIG. 2) from the position of an antinode of the standing wave to the first connection point 21a, 21b is shorter than the distance ($d_2$ shown in FIG. 2) from the position of an antinode of the standing wave to the second connection point 22a, 22b. However, the distance from the position of an antinode of the standing wave to the first connection point 21a, 21b is the distance from an antinode closest to the first connection point 21a, 21b, and the distance from the position of an antinode of the standing wave to the second connection point 22a, 22b is the distance from an antinode closest to the second connection point 22a, 22b.

Impedances of the connection circuits 21 and 22 are correlated with an absolute value of an amplitude of the standing wave and are determined in accordance with the distances from an antinode to the first connection point 21a, 21b and the second connection point 22a, 22b. As shown in FIG. 2(b), as the distance from an antinode of the standing wave to the first or the second connection point 22a, 22b becomes longer, an absolute value of the amplitude of the standing wave becomes smaller. On the other hand, as the distance from the antinode of the standing wave to the first or the second connection point 22a, 22b becomes longer, impedances of the connection circuits 21 and 22 become larger.

The impedances (Z) of the connection circuits 21 and 22 can be expressed by the following formula (2).

[Formula 2]

$$Z \approx R + \frac{1}{j\omega C} \quad (2)$$

"R" represents a resistance value of the resistant member in the connection circuits 21 and 22, and "C" represents a capacity value of the capacitive member in the connection circuits 21 and 22.

In the preset embodiment, the distance from the antinode of the standing wave to the first connection point 21a, 21b is shorter than the distance from the antinode of the standing wave to the second connection point 22a, 22b. Also, the impedance of the connection circuit 21 is larger than the impedance of the connection circuit 22. In this way, electrical oscillation generated between the power feeding bus 11 and power feeding bus 12 can be suppressed by the connection circuits 21 and 22.

Figure 3:
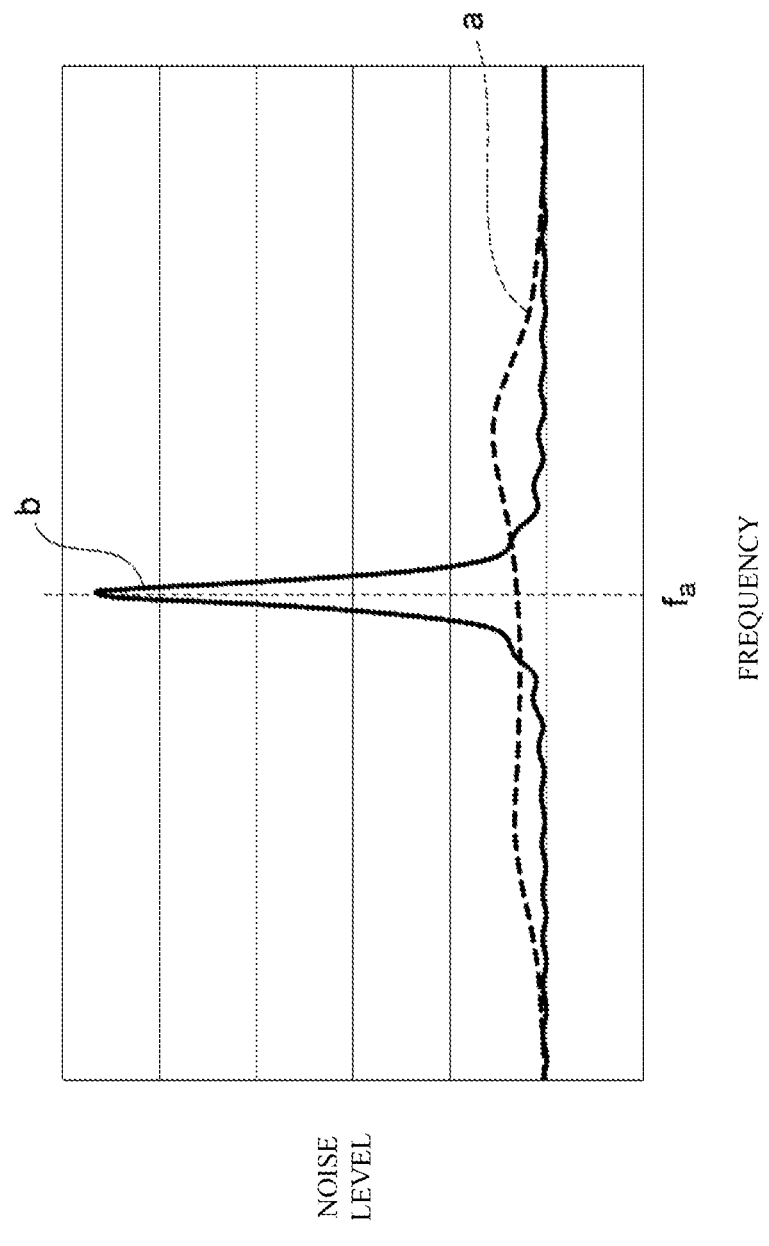
FIG. 3 is a graph illustrating noise characteristics of a power converter according to the present embodiment and noise characteristics of a power converter according to a comparative example.

A noise suppression effect of the present invention will be explained using FIG. 3. FIG. 3 is a graph illustrating noise characteristics according to the present embodiment and a comparative example. The horizontal axis indicates frequency and the vertical axis indicates the noise level. In FIG. 3, graph a represents noise characteristics of the present embodiment and graph b represents noise characteristics of the comparative example.

In the comparative example, the noise level becomes quickly high at a specific frequency "fa". On the other hand, in the present embodiment, the noise level is suppressed at the specific frequency "fa" so that the noise can be suppressed at wider frequency band including the frequency "fa". Thus, in the present embodiment, by allowing different impedances for the connection circuits 21 and 22, and by connecting the connection circuits 21 and 22 between the power feeding bus 11 and power feeding bus 22, the noise can be suppressed.

Further, when the standing wave is divided by ¼ period into segments, the first connection point 21a, 21b and the second connection point 22a, 22b are positioned to different segments in the present embodiment, however, the first connection point 21a, 21b and the second connection point 22a, 22b may be positioned within the same segment.

The power module 5 above corresponds to "an inverter" according to the present invention, the power feeding bus 11 corresponds to "a first power feeding bus" according to the present invention, the power feeding bus 12 corresponds to "a second power feeding bus" according to the present invention, the connection circuit 21 corresponds to "a first connection circuit" according to the present invention, and the connection circuit 22 correspond to "a second connection circuit" according to the present invention.

Second Embodiment

A power converter according to another embodiment of the present invention will be described. In the present embodiment, the position of the first connection point and the position of the second connection point are different compared to the first embodiment described above. Other configurations are the same as those described in the first embodiment and their descriptions are accordingly referenced.

Figure 4:
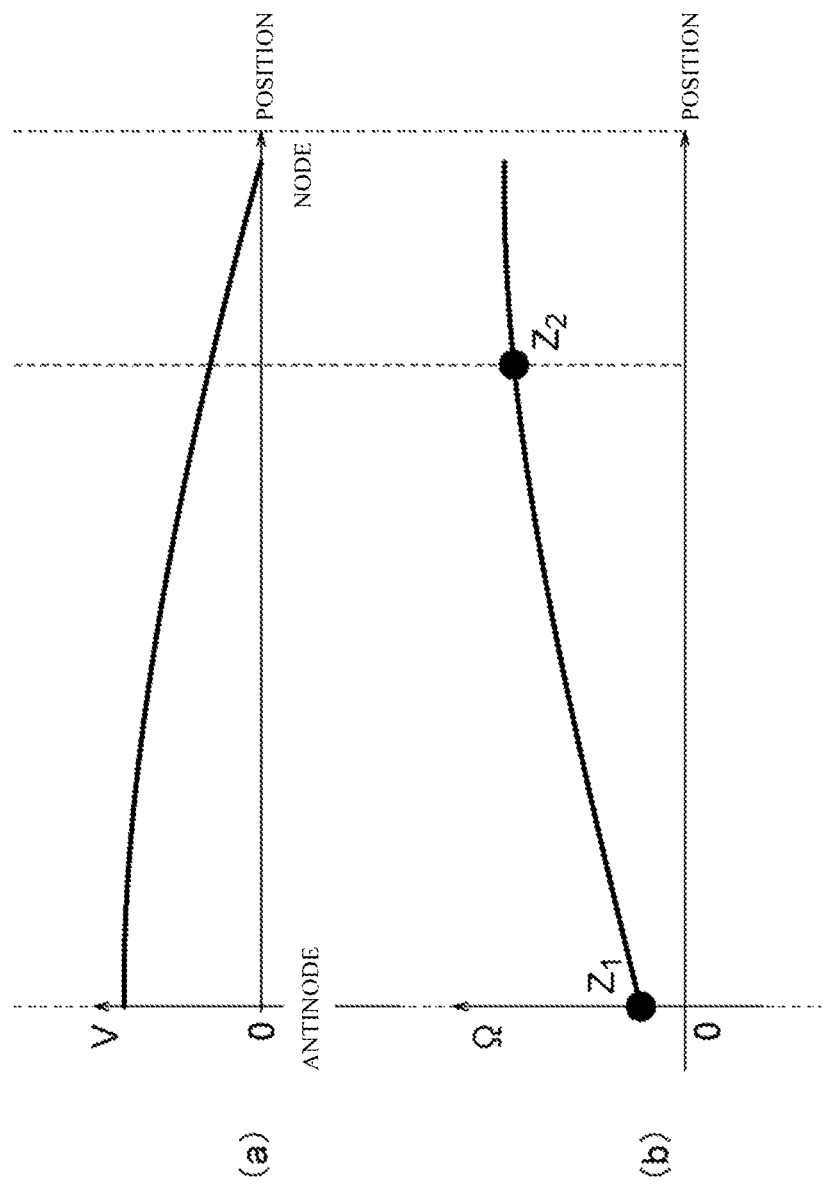
FIG. 4(a) is a graph illustrating a standing wave generated at the power feeding buses.
FIG. 4(b) is a graph illustrating impedance characteristics with respective to positions of the connection points of the connection circuits.

FIG. 4(a) is a graph illustrating a standing wave generated at the power feeding buses 11 and 12. FIG. 4(b) is a graph representing impedance of the connection circuits 21 and 22 with respect to the positions of the connection points of the connection circuits 21 and 22. Additionally, the vertical axis and horizontal axis shown in FIG. 4(a) and FIG. 4(b) are the same as those in FIG. 2(b) and FIG. 2(c). Further, unlike FIG. 2(b) and FIG. 2(c), a characteristic that corresponds to ¼ period of the standing wave is shown in FIG. 4(a) and FIG. 4(b).

The first connection point is positioned to an antinode of the standing wave. The second connection point is located between the antinode and a node of the standing wave.

Figure 5:
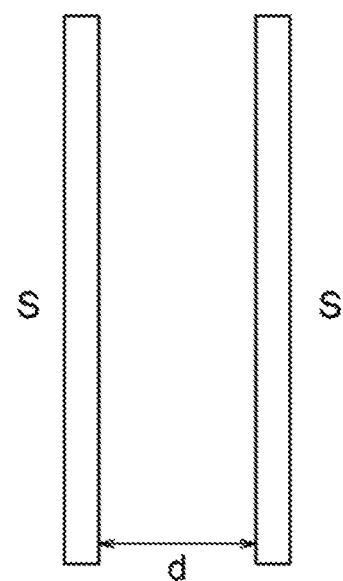
FIG. 5 is a sectional view of the power feeding buses.
Figure 6:
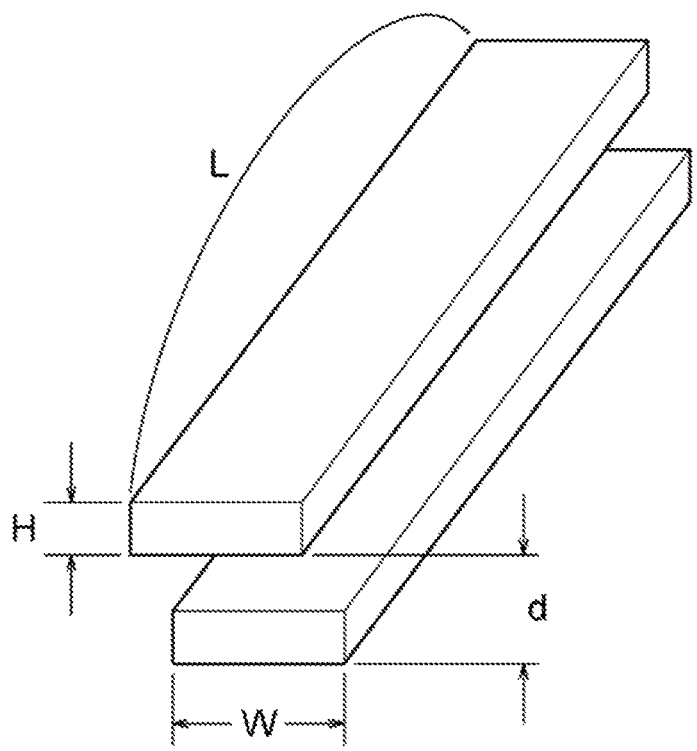
FIG. 6 is a perspective view of the power feeding buses.

Now, a characteristic impedance ($Z_{12}$) between the power feeding bus 11 and power feeding bus 12 will be explained using a formula. FIG. 5 is a sectional view of the power feeding buses 11 and 12. FIG. 6 is a perspective view of the power feeding buses 11 and 12.

In FIG. 5, the distance between the power feeding bus 11 and the second power feeding bus is "d" and the area of the surfaces of the power feeding bus 11 and power feeding bus 12 that face each other is "S". Additionally, permittivity in a vacuum is "$\varepsilon_0$" and relative permittivity is "$\varepsilon_r$".

The capacity ($C_{12}$) between the power feeding bus 11 and power feeding bus 12 can be represented by the following formula (3).

[Formula 3]

$$C_{12} \approx \varepsilon_0 \varepsilon_r \frac{S}{d} \quad (3)$$

In FIG. 6, "L" is the length of the power feeding buses 11 and 12, "W" is the width, and "H" is the height. The following formulas (4) to (6) represents the self-inductance (L) of the power feeding buses 11 and 12, mutual inductance (M) of the power feeding buses 11 and 12, and inductance ($L_{12}$) between the power feeding bus 11 and power feeding bus 12.

[Formula 4]

$$L \approx \frac{\mu_0 l}{2\pi} \left[ \ln\left(\frac{2l}{w+H}\right) + \frac{1}{2} + \frac{0.2235(w+H)}{l} \right] \quad (4)$$

[Formula 5]

$$M \approx \frac{\mu_0 l}{2\pi} \left[ \ln\left(\frac{2l}{d}\right) - 1 + \frac{d}{l} \right] \quad (5)$$

[Formula 6]

$$L_{12} = 2L - M \quad (6)$$

Furthermore, the following formula (7) represents the characteristic impedance ($Z_{12}$) between the power feeding bus 11 and power feeding bus 12.

[Formula 7]

$$Z_{12} \approx \sqrt{\frac{L_{12}}{C_{12}}} \quad (7)$$

Figure 7:
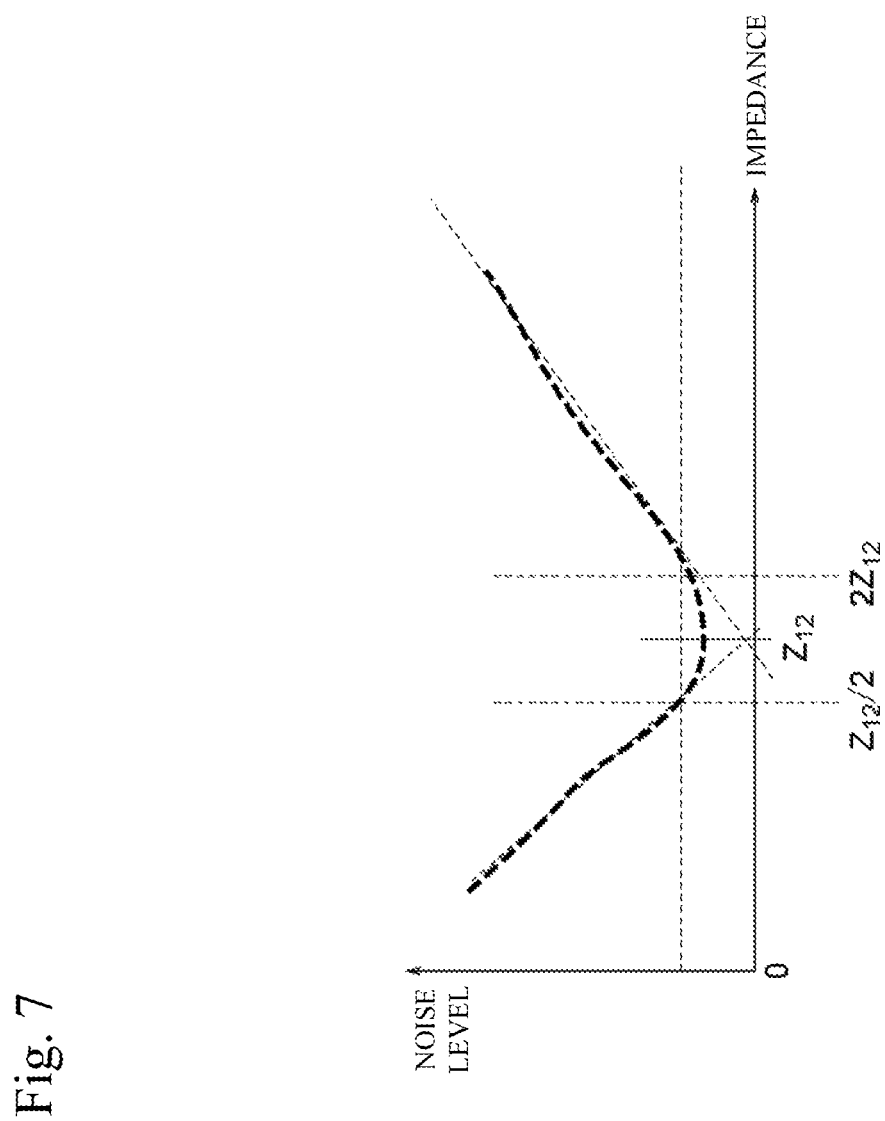
FIG. 7 is a graph illustrating a characteristic of a noise level with respect to impedance of the connection circuits.

Next, the relationship between the impedance of the connection circuit 21 and the noise generated at the power feeding buses 11 and 12 will be explained using FIG. 7. FIG. 7 is a graph illustrating a characteristic of the noise level with respect to impedance of the connection circuit 21. The noise level is the magnitude of oscillation (noise) generated between the power feeding bus 11 and the power feeding bus 12.

As shown in FIG. 7, when impedance of the connection circuit 21 is set to the impedance ($Z_{12}$) between the power feeding bus 11 and power feeding bus 12, impedance matching may be made between the power feeding buses 11 and 12 and connection circuit 21. Subsequently, it becomes easy for the noise generated at the power feeding buses 11 and 12 to flow into the connection circuit 21 and thus noise can be suppressed.

Also, in the present embodiment, when the impedance ($Z_1$) of the connection circuit 21 is set within a range represented by the following formula (8) as shown in FIG. 7, a reduction effect to the noise level can be sufficiently obtained.

[Formula 8]

$$\tfrac{1}{2} Z_{12} \leq Z_1 \leq 2 Z_{12} \qquad (8)$$

As above, in the present embodiment, the connection circuit 21 is connected to the power feeding buses 11 and 12 at the part that corresponds to the antinode of the standing wave. In this way, as shown in FIG. 1, when a smoothing capacitor 4 or the like is connected to the power feeding buses 11 and 12 so as to branch each current flow of the power feeding buses 11 and 12, the connection circuit 21 can be connected to the power feeding buses 11 and 12 while avoiding the branch point of the current. More, depending on the connection position of the connection circuit 21, by setting impedance of the connection circuit 21 so as to make impedance matching with the impedance ($Z_{12}$) between the power feeding bus 11 and power feeding bus 12, the noise due to switching of the power module 5 can be suppressed.

Third Embodiment

Now, the power converter according to another embodiment of the present invention will be explained. In the present embodiment, the position of the first connection point and the position of the second connection point varies compared to the first embodiment described above. Other configurations are the same as those described in the first embodiment and their descriptions are accordingly referenced.

Figure 8:
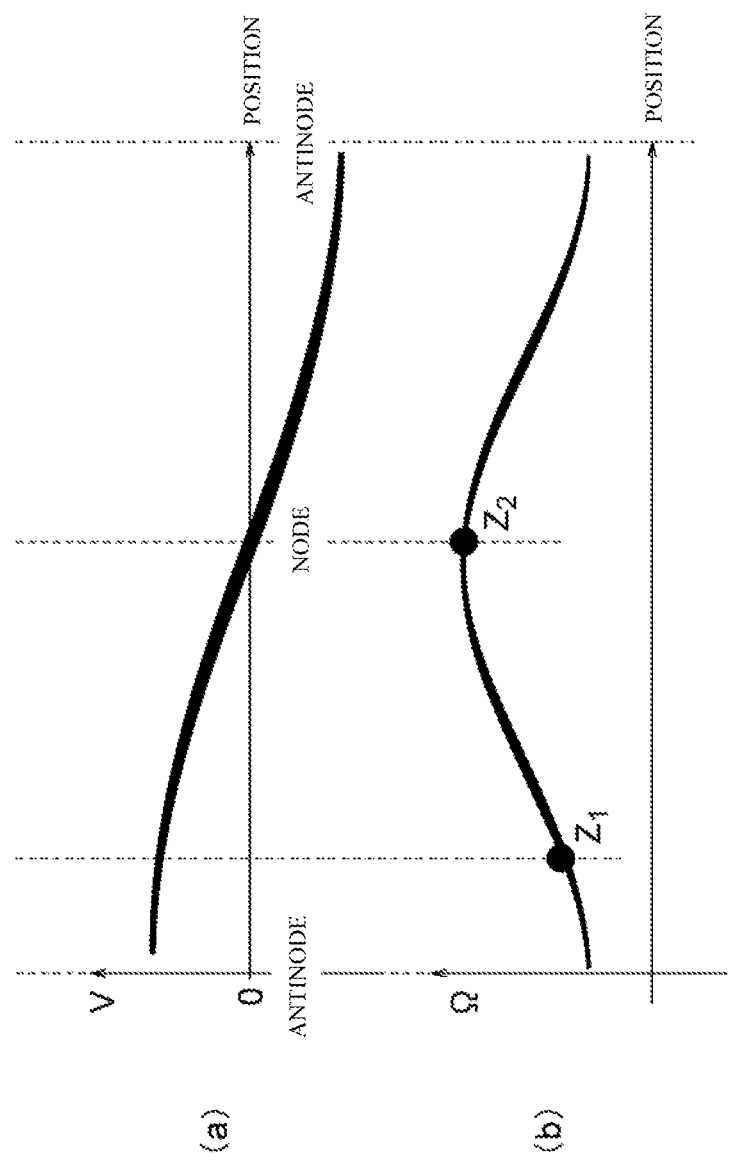
FIG. 8(a) is a graph illustrating a standing wave generated at the power feeding buses.
FIG. 8(b) is a graph illustrating impedance characteristics with respect to positions of the connection points of the connection circuits.

FIG. 8(a) is a graph illustrating a standing wave generated in the power feeding buses 11 and 12, and FIG. 8(b) is a graph illustrating impedance of the connection circuits 21 and 22 with respect to the positions of the connection points on the connection circuits 21 and 22. More, the vertical axis and horizontal axis in FIG. 8(a) and FIG. 8(b) are the same as those in FIG. 2(b) and FIG. 2(c). Further, unlike FIG. 2(b) and FIG. 2(c), a characteristic that corresponds to ¼ period of a standing wave is shown in FIG. 8(a) and FIG. 8(b).

Next, the first connection point is positioned between an antinode and node of the standing wave. The second connection point is positioned at the node of the standing wave. The impedance of the connection circuit 22 is smaller than the impedance of the connection circuit 21.

Figure 9:
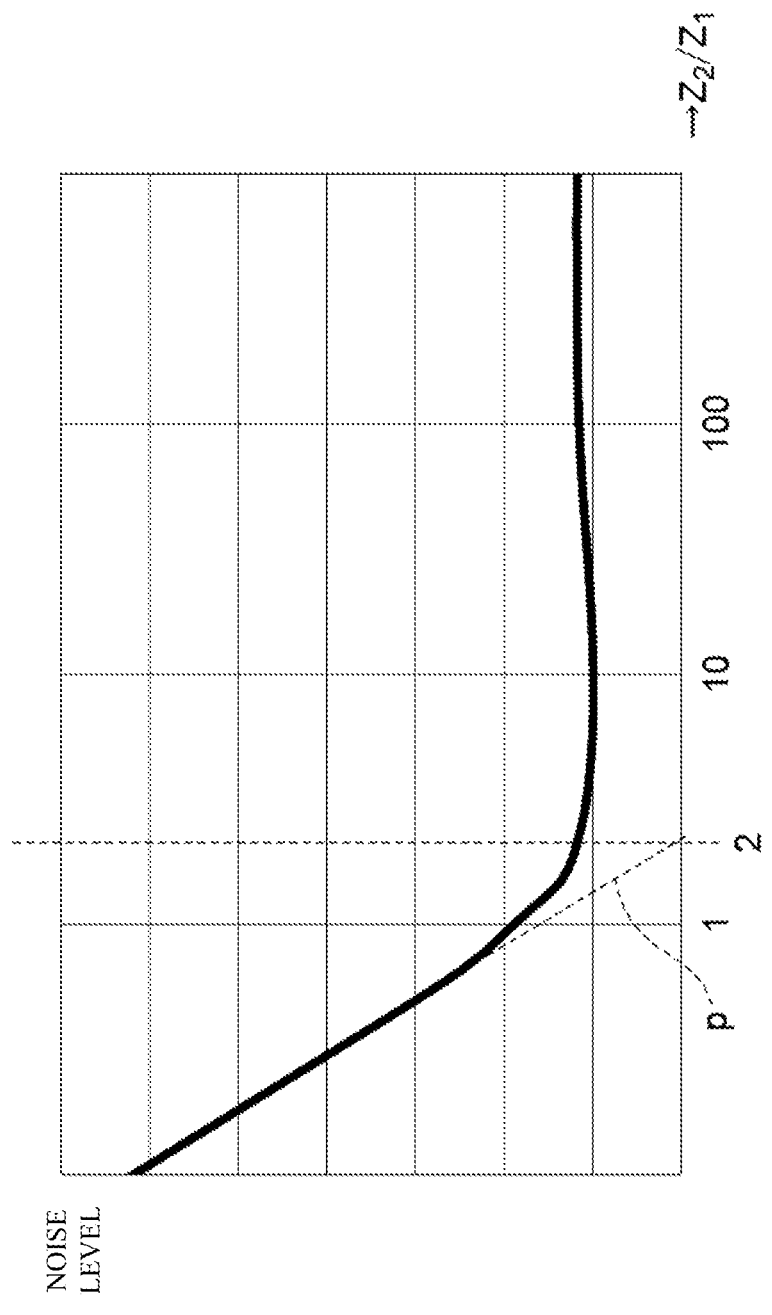
FIG. 9 is a graph illustrating noise level characteristics with respect to a ratio of impedances ($Z_2/Z_1$).

Next, the relationship between the ratio of the impedance of the connection circuit 21 and impedance of the connection circuit 22 and the noise generated in the power feeding buses 11 and 12 will be explained using FIG. 9. FIG. 9 is a graph illustrating a characteristic of the noise level with respect to a ratio of impedance ($Z_2/Z_1$) and shows the characteristic obtained from an experiment. The noise level is the magnitude of oscillation (noise) generated between the power feeding bus 11 and power feeding bus 12. In FIG. 9, a dotted line P is an asymptote.

As shown in FIG. 9, when the ratio of impedances is set to 2 or greater, the noise generated between the power feeding bus 11 and power feeding bus 12 can be suppressed.

Fourth Embodiment

A power converter according to another embodiment of the present invention will be explained. In the present embodiment, the position of the first connection point and the position of the second connection point are different compared to the first embodiment described above. Other configurations are the same as those described in the first embodiment and their descriptions are accordingly referenced.

Figure 10:
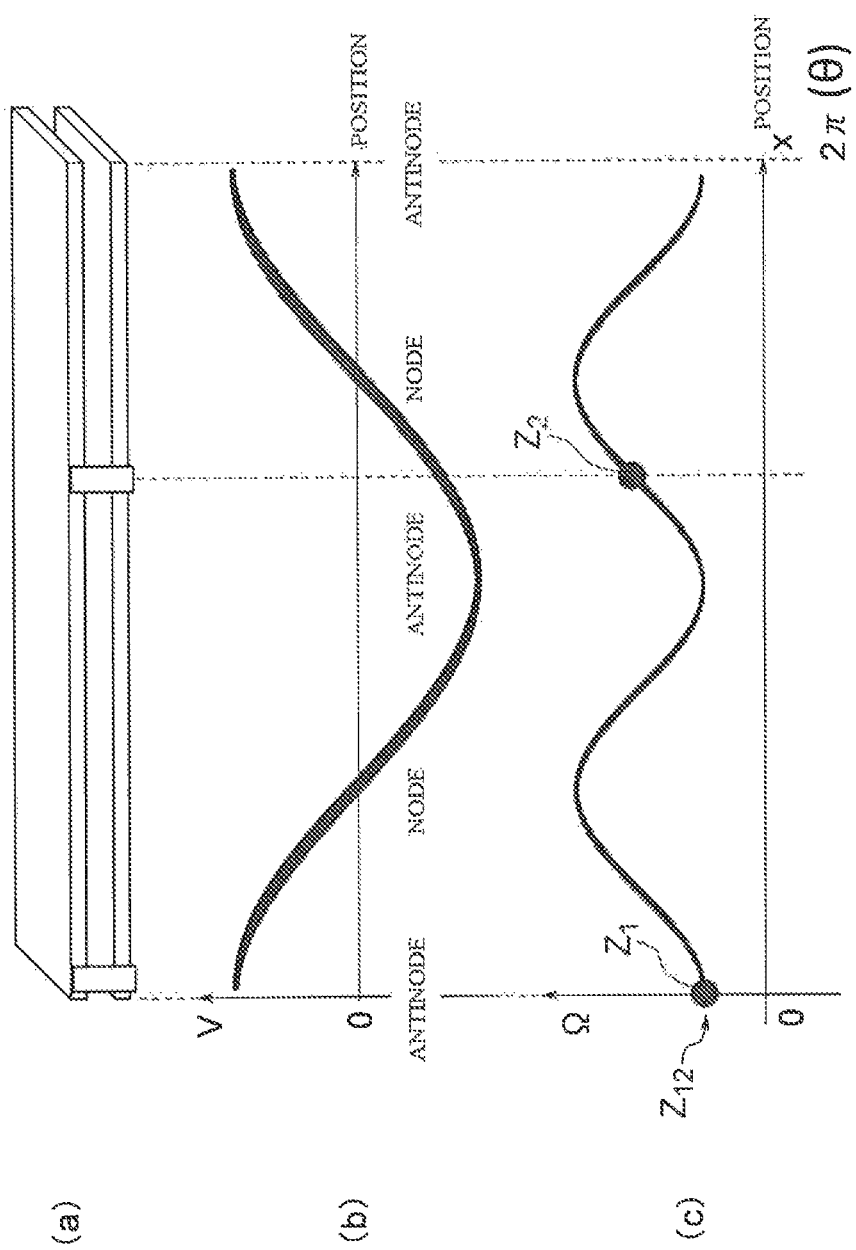
FIG. 10(a) illustrates a perspective view of the power feeding buses and connection circuits.
FIG. 10(b) is a graph illustrating a standing wave generated at the power feeding buses.
FIG. 10(c) is a graph illustrating impedance characteristics with respect to positions of the connection points of the connection circuits.

FIG. 10(a) illustrates a perspective view of the power feeding buses 11 and 12 and connection circuits 21 and 22. FIG. 10(b) is a graph illustrating a standing wave generated at the power feeding buses 11 and 12. FIG. 10(c) is a graph illustrating impedance of the connection circuits 21 and 22 with respect to the positions of the connection points of the connection circuits 21 and 22. Here, the horizontal axis in FIG. 10(b) and FIG. 10(c) represents the position from an end of the power feeding buses 11 and 12 in the longitudinal direction. More, the position represented by the horizontal axis in FIG. 10(c) is displayed in radian. One end of the power feeding buses 11 and 12 is "0" and the other end is "2π". Further, the center part from both ends is "π".

The impedances ($Z_1, Z_2$) of the connection circuits 21 and 22 are correlated with an absolute value of the amplitude of the standing wave and have the relationship as shown in the following formula (9).

[Formula 9]

$$Z_1, Z_2 = \left| \frac{Z_{12}}{\cos \theta} \right| \qquad (9)$$
$$\theta = \frac{\pi}{180} \times x$$

When the position of an antinode of the standing wave shown in FIG. 10(b) is "0" and the position that corresponds to one period of the standing wave from the antinode is "2π", "θ" represents each distance of the distance from the antinode to the first connection point and distance from the antinode to the second connection point in angles.

As shown in FIG. 10(c), the impedance ($Z_1, Z_2$) of the connection circuits 21 and 22 has a characteristic where it becomes the minimum at the position of the antinode of the standing wave and the maximum at the position of the node of the standing wave. The impedance ($Z_1, Z_2$) at the position of the antinode of the standing wave is $Z_{12}$.

Further, by setting the impedance ($Z_1, Z_2$) of the connection circuits 21 and 22 so as to satisfy the formula (9), impedance matching is made between the connection circuits 21 and 22 and power feeding buses 11 and 12, and it becomes easy for the noise generated at the power feeding buses 11 and 12 to be transmitted to the connection circuits 21 and 22.

As above, in the present embodiment, the impedance ($Z_1$, $Z_2$) of the connection circuits 21 and 22 is set to satisfy the above formula (9). In this way, electrical oscillation generated between the power feeding bus 11 and power feeding bus 12 can be suppressed in the connection circuits 21 and 22.

Fifth Embodiment

A power converter according to another embodiment of the present invention will be explained. The present embodiment is different from the first embodiment in the point that the relationship between the capacity of the capacitive member included in the connection circuits 21 and 22 and the capacity ($C_{12}$) between the power feeding bus 11 and power feeding bus 12 is specified. Other configurations are the same as those described in the first embodiment and their descriptions are accordingly referenced.

The level of the noise generated in the power feeding buses 11 and 12 varies depending on the relationship between the capacity of the capacitive member included in the connection circuits 21 and 22 and the capacity ($C_{12}$) between the power feeding bus 11 and 12.

Figure 11:
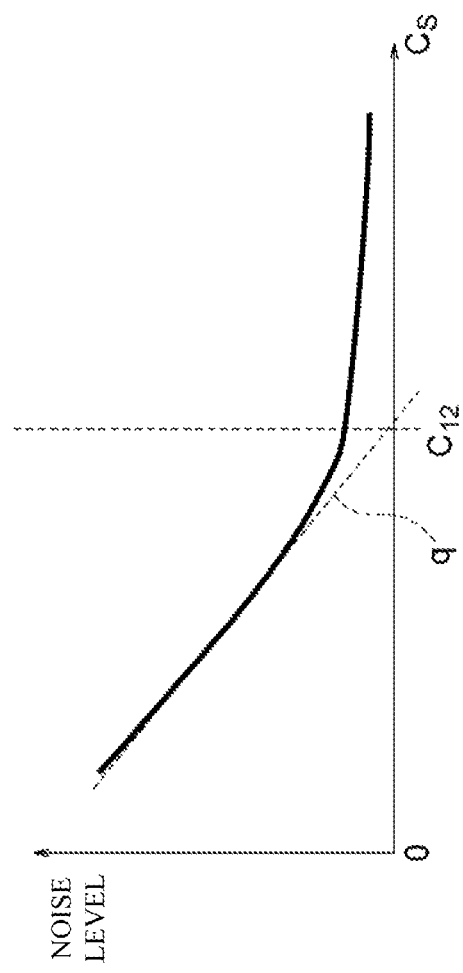
FIG. 11 is a graph illustrating noise level characteristics with respect to a capacitive member included in the connection circuits.

FIG. 11 is a graph illustrating a characteristic of the noise level with respect to the capacity of the capacitive member included in the connection circuits 21 and 22. The capacity ($C_{12}$) is represented by the above formula (3). In FIG. 11, a dotted line q is an asymptote.

As shown in FIG. 11, when the capacity of the capacitive member included in the connection circuits 21 and 22 is larger than the capacity ($C_{12}$), the noise generated between the power feeding bus 11 and power feeding bus 12 can be suppressed.

Sixth Embodiment

Figure 12:
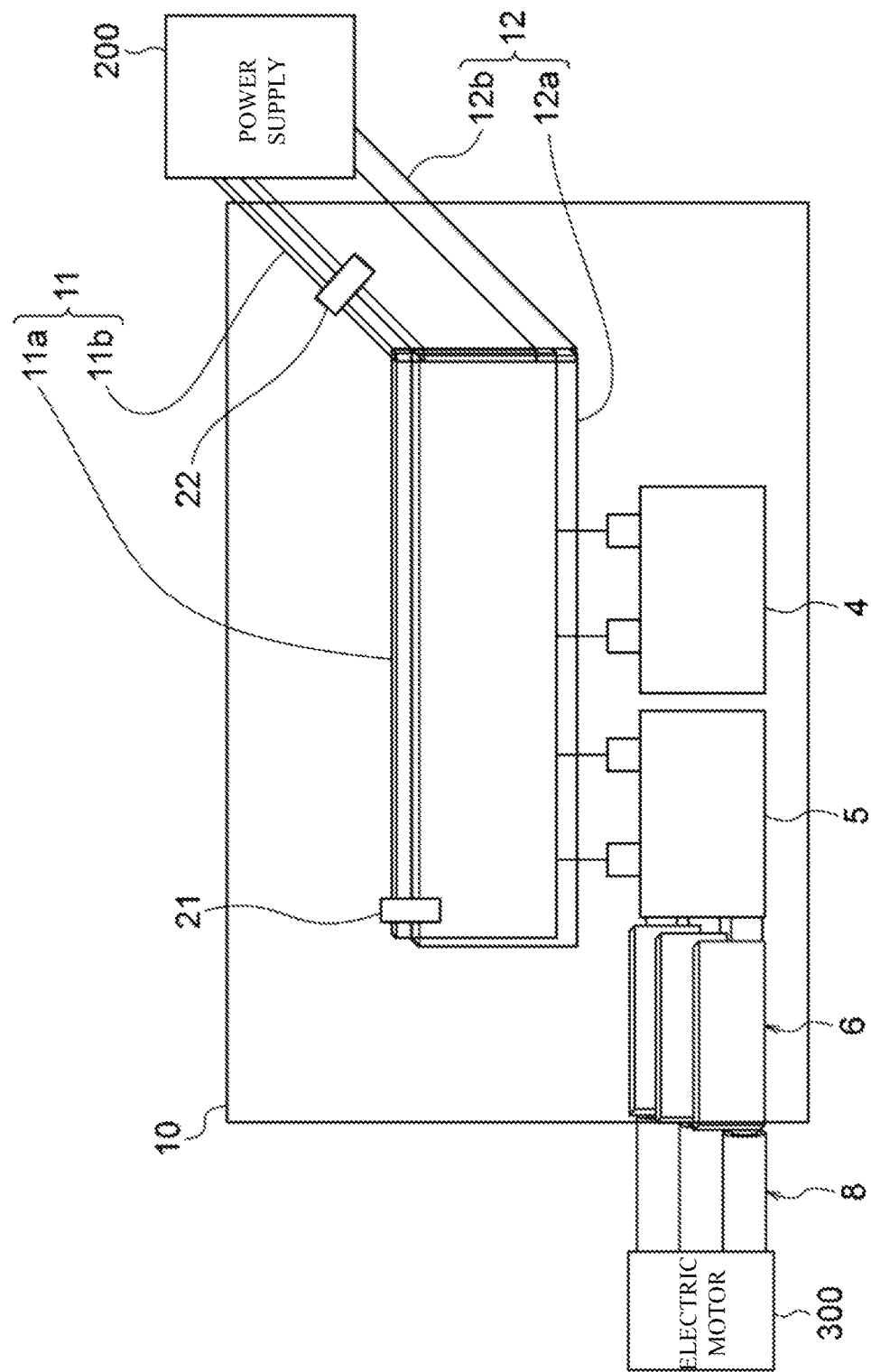
FIG. 12 is a schematic diagram of a drive system according to another embodiment of the invention.

FIG. 12 is a schematic diagram of a drive system including the power converter according to another embodiment of the invention. In the present embodiment, configuration of the power feeding buses 11 and 12 differs compared to the first embodiment described above. More, instead of the shielded wires 7, the power feeding buses 11 and 12 are directly connected to the power supply 200. Other configurations are the same as those in the first embodiment described above and descriptions in the first to fifth embodiments are accordingly referenced.

As shown in FIG. 12, the power feeding bus 11 includes a power feeding bus 11a and power feeding bus 11b. Each of the power feeding bus 11a and power feeding bus 11b is made with a plate-type conductor. Further, an end located in the longitudinal direction of the power feeding bus 11a is connected to an end located in the longitudinal direction of the power feeding bus 11b. More, the power feeding buses 11a and 11b are connected so that the main surface of the power feeding bus 11a and the main surface of the power feeding bus 11b become perpendicular to each other. In other words, the power feeding bus 11 is formed by a bent conductor.

The power feeding bus 12 includes a power feeding bus 12a and power feeding bus 12b. Configurations of the power feeding bus 12a and power feeding bus 12b are the same as the configurations of the power feeding bus 11a and power feeding bus 11b. The main surface of the power feeding bus 11a and the main surface of the power feeding bus 12a are faced each other with a certain space interposed therebetween. Similarly, the main surface of the power feeding bus 11b and the main surface of the power feeding bus 12b are faced each other with a certain space interposed therebetween.

The connection circuits 21 and 22 have different impedances from each other like in the first embodiment. The connection circuit 21 is connected between the power feeding bus 11a and power feeding bus 12a. The connection circuit 22 is connected between the power feeding bus 11b and power feeding bus 12b. When there are parts where the connection circuits 21 and 22 can be easily connected and the connection circuits 21 and 22 cannot be easily connected due to bending of the power feeding buses 11 and 12, connect the connection circuits 21 and 22 at the part where the connection circuits 21 and 22 can be easily connected to the power feeding buses 11 and 12. In such a case, the impedance of the connection circuits 21 and 22 is set in accordance with the connection position so that impedance matching can be made between the power feeding buses 11 and 12.

As above, in the present embodiment, by arranging a bent part in the power feeding buses 11 and 12, the position of the power supply 200 can be changed. In this way, while providing flexibility in the layout such as the position of the power supply 200, oscillation generated between the power feeding bus 11 and power feeding bus 12 can be suppressed.

Seventh Embodiment

Figure 13:
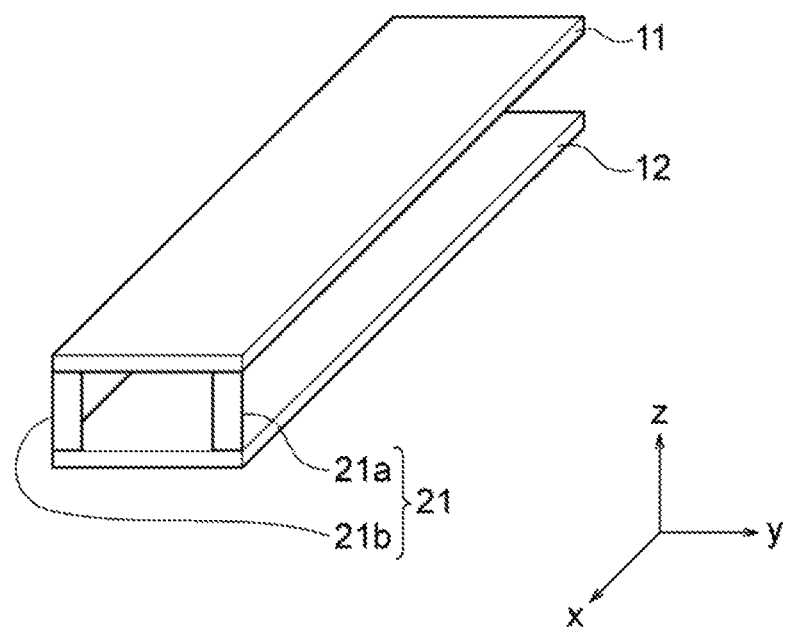
FIG. 13 is a perspective view of the power feeding buses and connection circuits of the power converter according to another embodiment of the invention.

FIG. 13 is a perspective view of the power feeding buses 11 and 12 in accordance with the configuration of the power converter according to another embodiment of the invention. In the present embodiment, the configuration of the connection circuit 21 varies from the first embodiment described above. Other configurations are the same as those in the first embodiment described above, and descriptions in the first to sixth embodiments are accordingly referenced. Additionally, although illustration is omitted from FIG. 12, the connection circuit 22 is connected between the power feeding bus 11 and power feeding bus 12.

The connection circuit 21 includes a plurality of series circuit 21a and 21b. The series circuit 21a is a series circuit including a resistant member and capacitive member. The series circuit 21b is a series circuit including a resistant member and capacitive member. The plurality of series circuits 21a and 21b are disposed with a space interposed between the series circuit 21a and the series circuit 21b and the series circuit 21a and the series circuit 21b are aligned in the short-length direction of the power feeding buses 11 and 12. As shown in FIG. 13, the power feeding buses 11 and 12 are formed with a plate-type member that extends in the longitudinal direction, which is the x-direction. Their short-length direction (the y-direction shown in FIG. 13) is the direction along the main surface of the power feeding buses 11 and 12 and is the direction perpendicular to the longitudinal direction.

"$R_{1a}$" is the resistance of the resistant member of the series circuit 21a, "$C_{1a}$" is the capacity of the capacitive member of the series circuit 21a, "$R_{1b}$" is the resistance of the resistant member of the series circuit 21b, and "$C_{1b}$" is the capacity of the capacitive member of the series circuit 21b. Since the series circuit 21a and series circuit 21b included in the connection circuit 21 are connected in parallel, the capacity ($C_1$) of the connection circuit 21 is "$C_{1a}+C_{1b}$" and the following formula (10) represents the resistance of the connection circuit 21.

[Formula 10]

$$R_1 \approx \frac{R_{1a}R_{1b}}{R_{1a} + R_{1b}} \quad (10)$$

In this way, the connection circuit 21 can be connected by dividing it into the series circuit 21a and series circuit 21b. Also, in order to make impedance matching between the power feeding buses 11 and 12 and connection circuit 21, the capacity of the connection circuit 21 can be divided into the series circuit 21a and series circuit 21b even when the capacity of the connection circuit 21 is a large value. Accordingly, the capacity of an element used as the capacitive member of the connection circuit 21 can be reduced.

The number of series circuit included in the connection circuit 21 is not limited to two as in the present embodiment but may be three or more. Also, the connection circuit 22 may include a plurality of series circuits like the connection circuit 21.

The series circuit 21a above corresponds to "the first series circuit" according to the present invention and the series circuit 21b above corresponds to "the second series circuit" according to the present invention.

DESCRIPTION OF REFERENCE NUMERALS

4 . . . smoothing capacitor
5 . . . power module
6 . . . bus bar
7, 8 . . . shielded wire
10 . . . case
11, 12 . . . power feeding bus
21, 22 . . . connection circuit
100 . . . power converter
200 . . . DC power supply
300 . . . electric motor

The invention claimed is:

1. A power converter comprising:
an inverter for converting electric power output from a power supply;
a first power feeding bus connected to the inverter and positive side of the power supply;
a second power feeding bus connected to the inverter and negative side of the power supply; and
a plurality of connection circuits including a resistant member and a capacitive member which are connected in series, connected between the first power feeding bus and the second power feeding bus, and having at least two or more different impedances, wherein
the plurality of connection circuits includes a first connection circuit and a second connection circuit,
the first connection circuit, using each of a connection point to the first power feeding bus and a connection point to the second power feeding bus as a first connection point, is connected to the first power feeding bus and the second power feeding bus,
the second connection circuit, using each of a connection point to the first power feeding bus and a connection point to the second power feeding bus as a second connection point, is connected to the first power feeding bus and the second power feeding bus,
the first connection point and the second connection point are positioned between an antinode and a node of a standing wave,
the standing wave is an oscillatory wave that transmits through the first power feeding bus and the second power feeding bus,
a distance from the antinode of the standing wave to the first connection point is shorter than a distance from the antinode of the standing wave to the second connection point, and
impedance of the first connection circuit is smaller than the impedance of the second connection circuit.

2. The power converter according to claim 1, wherein the first connection point is positioned to the antinode.

3. The power converter according to claim 2, wherein the impedance of the first connection circuit satisfies the following formula (1)

$$\tfrac{1}{2}Z_{12} \le Z_1 \le 2Z_{12} \quad (1)$$

where in the above formula (1), "$Z_1$" represents the impedance of the first connection circuit and "$Z_{12}$" represents a characteristic impedance between a first power feeding bus and the second power feeding bus.

4. The power converter according to claim 1, wherein the second connection point is positioned to the node and the following formula (2) is satisfied $$\frac{Z_2}{Z_1} \ge 2 \quad (2)$$

where in the above formula (2), "$Z_1$" represents the impedance of the first connection circuit and "$Z_2$" represents the impedance of the second connection circuit.

5. The power converter according to claim 1, wherein a capacity of the capacitive member is greater than a capacity between the first power feeding bus and the second power feeding bus.

6. The power converter according to claim 1, wherein
the first power feeding bus and the second power feeding bus are formed to a plate shape extending along a longitudinal direction, and
the first connection circuit and the second connection circuit are disposed with a space interposed between the first connection circuit and the second connection circuit and are aligned in the longitudinal direction.

7. The power converter according to claim 1, wherein the first power feeding bus and the second power feeding bus are formed to a bent shape.

8. The power converter according to claim 1, wherein the resistant member is a passive element.

9. A power converter comprising:
an inverter for converting electric power output from a power supply;
a first power feeding bus connected to the inverter and positive side of the power supply;
a second power feeding bus connected to the inverter and negative side of the power supply; and
a plurality of connection circuits including a resistant member and a capacitive member which are connected in series, connected between the first power feeding bus and the second power feeding bus, and having at least two or more different impedances, wherein
the plurality of connection circuits includes a first connection circuit and a second connection circuit,
the first connection circuit, using each of a connection point to the first power feeding bus and a connection point to the second power feeding bus as a first connection point, is connected to the first power feeding bus and the second power feeding bus, the second connection circuit, using each of a connection point to the first power feeding bus and a connection point to the second power feeding bus as a second connection point, is connected to the first power feeding bus and the second power feeding bus, an impedance of the first connection circuit satisfies the following formula (3), and an impedance of the second connection circuit satisfies the following formula (4)

$$Z_1 = \left|\frac{Z_{12}}{\cos \theta}\right| \quad (3)$$

$$Z_2 = \left|\frac{Z_{12}}{\cos \theta}\right| \quad (4)$$

where in the above formulas (3) and (4),

"$Z_1$" represents the impedance of the first connection circuit,

"$Z_{12}$" represents a characteristic impedance between the first power feeding bus and the second power feeding bus, "$Z_2$" represents the impedance of the second connection circuit, when a position of an antinode of a standing wave is "0" and a position that corresponds to one period of the standing wave from the antinode is "$2\pi$", "$\theta$" represents each distance of a distance from the antinode to the first connection point and a distance from the antinode to the second connection point in angles, and the standing wave is an oscillatory wave that transmits through the first power feeding bus and the second power feeding bus.

* * * * *